US012254869B2

(12) United States Patent
Tripathi et al.

(10) Patent No.: US 12,254,869 B2
(45) Date of Patent: *Mar. 18, 2025

(54) ONE MODEL UNIFYING STREAMING AND NON-STREAMING SPEECH RECOGNITION

(71) Applicant: Google LLC, Mountain View, CA (US)

(72) Inventors: Anshuman Tripathi, Mountain View, CA (US); Hasim Sak, Santa Clara, CA (US); Han Lu, Redmond, WA (US); Qian Zhang, Mountain View, CA (US); Jaeyoung Kim, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/357,225

(22) Filed: Jul. 24, 2023

(65) Prior Publication Data
US 2023/0368779 A1      Nov. 16, 2023

Related U.S. Application Data

(63) Continuation of application No. 17/210,465, filed on Mar. 23, 2021, now Pat. No. 11,741,947.

(Continued)

(51) Int. Cl.
*G10L 15/16*      (2006.01)
*G06N 3/04*       (2023.01)
(Continued)

(52) U.S. Cl.
CPC ............ *G10L 15/16* (2013.01); *G06N 3/04* (2013.01); *G06N 3/088* (2013.01); *G10L 15/063* (2013.01);
(Continued)

(58) Field of Classification Search
CPC .................. G06N 3/04; G06N 3/088
See application file for complete search history.

(56) References Cited

U.S. PATENT DOCUMENTS

2017/0148431 A1    5/2017  Catanzaro et al.
2020/0135174 A1    4/2020  Cui et al.
(Continued)

OTHER PUBLICATIONS

Tsunoo et al. "Towards Online End-to-End Transformer Automatic Speech Recognition". arXiv:1910.11871 [eess.AS] Oct. 25, 2019 (Year: 2019).*

(Continued)

*Primary Examiner* — Jesse S Pullias
(74) *Attorney, Agent, or Firm* — Honigman LLP; Brett A. Krueger; Grant Griffith

(57) ABSTRACT

A transformer-transducer model for unifying streaming and non-streaming speech recognition includes an audio encoder, a label encoder, and a joint network. The audio encoder receives a sequence of acoustic frames, and generates, at each of a plurality of time steps, a higher order feature representation for a corresponding acoustic frame. The label encoder receives a sequence of non-blank symbols output by a final softmax layer, and generates, at each of the plurality of time steps, a dense representation. The joint network receives the higher order feature representation and the dense representation at each of the plurality of time steps, and generates a probability distribution over possible speech recognition hypothesis. The audio encoder of the model further includes a neural network having an initial stack of transformer layers trained with zero look ahead audio context, and a final stack of transformer layers trained with a variable look ahead audio context.

18 Claims, 7 Drawing Sheets

Related U.S. Application Data

(60) Provisional application No. 63/087,817, filed on Oct. 5, 2020.

(51) Int. Cl.
*G06N 3/088* (2023.01)
*G10L 15/06* (2013.01)
*G10L 15/197* (2013.01)
*G10L 15/22* (2006.01)
*G10L 15/30* (2013.01)

(52) U.S. Cl.
CPC ............ *G10L 15/197* (2013.01); *G10L 15/22* (2013.01); *G10L 15/30* (2013.01)

(56) References Cited

U.S. PATENT DOCUMENTS

| 2021/0183373 | A1 | 6/2021 | Moritz et al. |
| 2021/0312905 | A1 | 10/2021 | Zhao et al. |
| 2021/0335341 | A1 | 10/2021 | Kang |

OTHER PUBLICATIONS

Li et al. "Parallel Rescoring with Transformer for Streaming On-Device Speech Recognition". arXiv:2008.13093v3 [eess.AS] Sep. 2, 2020 (Year: 2020).

Zhang et al. "A Simple and Effective Neural Model for Joint Word Segmentation and POS Tagging". IEEE/ACM Transactions on audio, speech, and language processing, vol. 26, No. 9, Sep. 2018 (Year: 2018).

Yeh et al. "Transformer-Transducer: End-to-End Speech Recognition with Self Attention". arXiv:1910.12977v1 [eess. AS| Oct. 28, 2019 (Year: 2019).

Shi et al. "Weak-Attention Suppression for Transformer Based Speech Recognition". arXiv:2005.09137v1 [eess.AS] May 18, 2020 (Year: 2020).

Indian Examination Report for the related Application No. 202327018207, dated Aug. 18, 2023, 6 pages.

Yeh, Ching-Feng, et al.: "Transformer-Transducer: End-to-End Speech Recognition with Self-Attention", Cornell University Library, 201 Olin Library Cornell University Ithaca, published Oct. 28, 2019, 5 pages.

\* cited by examiner

ONE MODEL UNIFYING STREAMING AND NON-STREAMING SPEECH RECOGNITION

CROSS REFERENCE TO RELATED APPLICATIONS

This patent application is a continuation of, and claims priority under 35 U.S.C. § 120 from, U.S. patent application Ser. No. 17/210,465, filed on Mar. 23, 2021, which claims priority under 35 U.S.C. § 119(e) to U.S. Provisional Application 63/087,817, filed on Oct. 5, 2020. The disclosures of these prior applications are considered part of the disclosure of this application and are hereby incorporated by reference in their entireties.

TECHNICAL FIELD

This disclosure relates to using a unified model for streaming and non-streaming speech recognition.

BACKGROUND

Automatic speech recognition (ASR), the process of taking an audio input and transcribing it into text, has greatly been an important technology that is used in mobile devices and other devices. In general, ASR attempts to provide accurate transcriptions of what a person has said by taking an audio input (e.g., speech utterance) and transcribing the audio input into text. Modern ASR models continue to improve in both accuracy (e.g. a low word error rate (WER)) and latency (e.g., delay between the user speaking and the transcription) based on the ongoing development of deep neural networks. When using an ASR system today there is a demand that the ASR system decodes utterances in a streaming fashion that corresponds to real-time or even faster than real-time, but is also accurate. However, one challenge in developing deep learning-based ASR models is that while streaming models are low latency, they can be inaccurate. Conversely, non-streaming models are associated with high latency, but are generally offer higher accuracy.

SUMMARY

One aspect of the present disclosure provides a single transformer-transducer model for unifying streaming and non-streaming speech recognition. The single transformer-transducer model includes an audio encoder, a label encoder, and a joint network. The audio encoder is configured to receive, as input, a sequence of acoustic frames, and generate, at each of a plurality of time steps, a higher order feature representation for a corresponding acoustic frame in the sequence of acoustic frames. The label encoder is configured to receive, as input, a sequence of non-blank symbols output by a final softmax layer, and generate, at each of the plurality of time steps, a dense representation. The joint network is configured to receive, as input, the higher order feature representation generated by the audio encoder and the dense representation generated by the label encoder at each of the plurality of time steps, and generate, at each of the plurality of time steps, a probability distribution over possible speech recognition hypothesis at the corresponding time step. The audio encoder of the model further includes a neural network having a plurality of transformer layers. The plurality of transformer layers includes an initial stack of transformer layers each trained with zero look ahead audio context, and a final stack of transformer layers each trained with a variable look ahead audio context.

Implementations of the disclosure may include one or more of the following optional features. In some implementations, each transformer layer of the audio encoder includes a normalization layer, a masked multi-head attention layer with relative position encoding, residual connections, a stacking/unstacking layer, and a feedforward layer. In these implementations, the stacking/unstacking layer may be configured to change a frame rate of the corresponding transformer layer to adjust processing time by the single transformer-transducer model during training and inference. In some examples, the initial stack of transformer layers includes more transformer layers than the final stack of transformer layers. In some examples, during training, the variable look ahead audio context is uniformly sampled for each transformer layer in the final stack of transformer layers.

In some implementations, the model further includes a low latency decoding branch configured to decode corresponding speech recognition results for an input utterance from audio data encoded using a first look ahead audio context, and a high latency decoding branch configured to decode corresponding speech recognition results for the input utterance from audio data encoded using a second look ahead audio context. Here, the second look ahead audio context includes a longer duration of look ahead audio than the first look ahead audio context. In these implementations, the initial stack of transformer layers may apply zero look ahead audio context to compute shared activations for use by both the low latency decoding branch and the high latency decoding branch, the final stack of transformer layers may apply the first look ahead audio context to compute low latency activations for use by the low latency decoding branch and not the high latency decoding branch, and the final stack of transformer layers may apply the second look ahead audio context to compute high latency activations for use by the high latency decoding branch and not the low latency decoding branch. In some additional implementations, first look ahead audio context includes zero look ahead audio context.

In some examples, the low latency decoding branch and the high latency decoding branch execute in parallel for decoding the corresponding speech recognition results for the input utterance. In these examples, the corresponding speech recognition results decoded by the high latency decoding branch for the input utterance are delayed from the corresponding speech recognition results decoded by the low latency decoding branch for the input utterance by a duration based on a difference between the second look ahead audio context and the first look ahead audio context. Additionally or alternatively, the low latency decoding branch may be configured to stream the corresponding speech recognition results as partial speech recognition results as the input utterance is received by the single transformer-transducer model, and the high latency decoding branch may be configured to output the corresponding speech recognition results as a final transcription after the single transformer-transducer model receives the complete input utterance.

In some implementations, the input utterance is directed toward an application, and a duration of the second look ahead audio context used by the high latency decoding branch to decode the corresponding speech recognition results for the input utterance is based on a type of the application the input utterance is directed toward. In some examples, the label encoder includes a neural network having a plurality of transformer layers. Alternatively, the label encoder may include a bigram embedding lookup decoder model. The single transformer-transducer model may execute on a client device or on a server-based system.

Another aspect of the present disclosure provides a computer-implemented method when executed on data processing hardware causes the data processing to perform operations that include receiving, as input to a transformer-transducer model, audio data corresponding to a spoken utterance, and performing, using the transformer-transducer model, streaming speech recognition and non-streaming speech recognition on the audio data in parallel. For a low latency branch of the transformer-transducer model, the operations also include, while receiving the audio data corresponding to the spoken utterance, encoding the audio data using a first look ahead audio context, decoding the audio data encoded using the first look ahead audio context into partial speech recognition results for the input utterance, and streaming the partial speech recognition results for the input utterance. For a high latency branch of the transformer-transducer model, the operations include, after the audio data corresponding to the spoken utterance is received, encoding the audio data using a second look ahead audio context, decoding the audio data encoded using the second look ahead audio context into a final speech recognition result for the input utterance, and replacing the streamed partial speech recognition results with the final speech recognition result.

This aspect may include one or more of the following optional features. In some implementations, the operations further include an audio encoder including a neural network having a plurality of transformer layers. The plurality of transformer layers includes an initial stack of transformer layers each trained with zero look ahead audio context, and a final stack of transformer layers each trained with a variable look ahead audio context. Each transformer layer may include a normalization layer, a masked multi-head attention layer with relative position encoding, residual connections, a stacking/unstacking layer, and a feedforward layer. Here, stacking/unstacking layer may be configured to change a frame rate of the corresponding transformer layer to adjust processing time by the single transformer-transducer model during training and inference.

In some examples, the initial stack of transformer layers includes more transformer layers than the final stack of transformer layers. In some implementations, during training, the variable look ahead audio context is uniformly sampled for each transformer layer in the final stack of transformer layers. In some examples, the initial stack of transformer layers apply zero look ahead audio context to compute shared activations for use by both the low latency branch and the high latency branch, the final stack of transformer layers apply the first look ahead audio context to compute low latency activations for use by the low latency branch and not the high latency decoding branch, and the final stack of transformer layers apply the second look ahead audio context to compute high latency activations for use by the high latency branch and not the low latency branch. The first look ahead audio context may include zero look ahead audio context. In some implementations, the final speech recognition results decoded by the high latency branch for the input utterance is delayed from the partial speech recognition results decoded by the low latency branch for the input utterance by a duration based on a difference between the second look ahead audio context and the first look ahead audio context.

In some examples, the operations further include receiving an application identifier indicating a type of application the input utterance is directed toward, and setting a duration of the second look ahead audio context based on the application identifier. In some implementations, transformer-transducer model includes a label encoder including a neural network having a plurality of transformer layers. In some examples, the transformer-transducer model includes a label encoder including a bigram embedding lookup decoder model. The data processing hardware executes on the transformer-transducer model and resides on either a client device or a server-based system.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
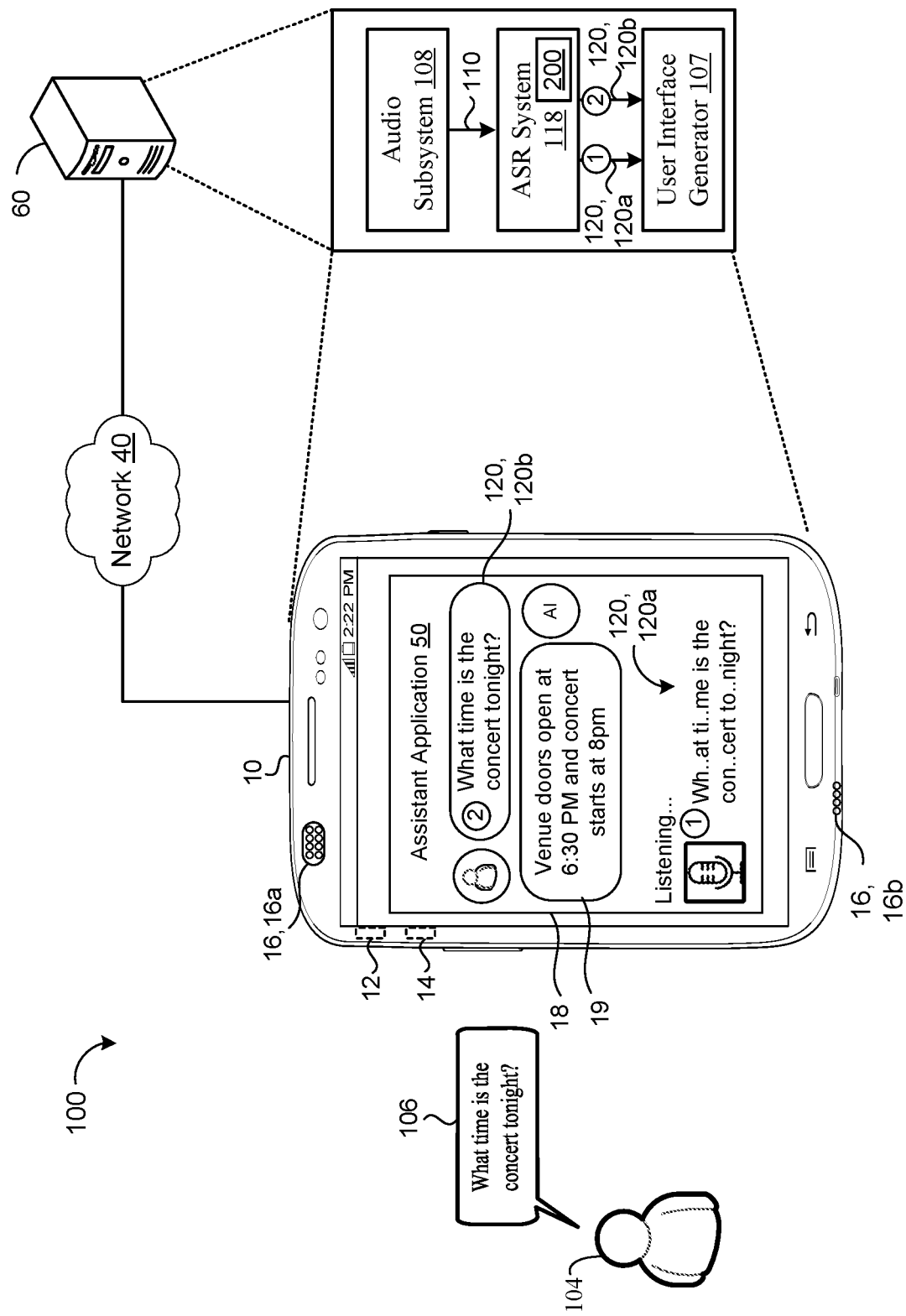
FIG. 1 is a schematic view of a speech environment implementing a single transformer-transducer model to perform streaming and non-streaming speech recognition.

Automatic speech recognition (ASR) systems focus on providing not only quality/accuracy (e.g., low word error rates (WERs)), but also low latency (e.g., a short delay between the user speaking and a transcription appearing). Recently, end-to-end (E2E) ASR models have gained popularity in achieving state-of-the-art performance in accuracy and latency. In contrast to conventional hybrid ASR systems that include separate acoustic, pronunciation, and language models, E2E models apply a sequence-to-sequence approach to jointly learn acoustic and language modeling in a single neural network that is trained end to end from training data, e.g., utterance-transcription pairs. Here, an E2E model refers to a model whose architecture is constructed entirely of a neural network. A full neural network functions without external and/or manually designed components (e.g., finite state transducers, a lexicon, or text normalization modules). Additionally, when training E2E models, these models generally do not require bootstrapping from decision trees or time alignments from a separate system.

Examples of sequence-to-sequence models include "attention-based" models and "listen-attend-spell" (LAS) models. An LAS model transcribes speech utterances into characters using a listener component, an attender component, and a speller component. Here, the listener is a recurrent neural network (RNN) encoder that receives an audio input (e.g., a time-frequency representation of speech input) and maps the audio input to a higher-level feature representation. The attender attends to the higher-level feature to learn an alignment between input features and predicted sub word units (e.g., a grapheme or a wordpiece). The speller is an attention-based RNN decoder that generates character sequences from the input by producing a probability distribution over a set of hypothesized words. As attention-based models such as the LAS model generally process an entire sequence (e.g., audio waveform) and use the audio context for the entire sentence before generating an output (e.g., a sentence) based thereon, these models provide the output as a non-streaming transcription.

Moreover, when using an ASR system today there may be a demand for the ASR system to decode utterances in a streaming fashion that corresponds to displaying a description of an utterance in real time, or even faster than real-time, as a user speaks. To illustrate, when an ASR system is displayed on a user computing device, e.g., such as a mobile phone, that experiences direct user interactivity, an application (e.g., a digital assistant application), executing on the user device and using the ASR system, may require the speech recognition to be streaming such that words, word pieces, and/or individual characters appear on the screen as soon as they are spoken. Additionally, it is also likely that the user of the user device has a low tolerance for latency. For instance, when the user speaks a query requesting the digital assistant to retrieve details from a calendar application for an upcoming appointment, the user would like the digital assistant to provide a response conveying the retrieved details as quickly as possible. Due to this low tolerance, the ASR system strives to run on the user device in a manner that minimizes an impact from latency and inaccuracy that may detrimentally affect the user's experience. However, attention-based sequence-to-sequence models such as the LAS model that function by reviewing an entire input sequence of audio before generating output text, do not allow for streaming outputs as inputs are received. Due to this deficiency, deploying attention-based sequence-to-sequence models for speech applications that are latency sensitive and/or require real-time voice transcription may pose issues. This makes an LAS model alone not an ideal model for latency-sensitive applications and/or applications providing streaming transcription capabilities in real-time as a user speaks.

Another form of a sequence-to-sequence model known as a recurrent neural network transducer (RNN-T) does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and be able to run offline (i.e., without a network connection); therefore, avoiding unreliability issues with communication networks.

Due to their inability to apply look ahead audio context (e.g., right context) when predicting recognition results, RNN-T models still lag behind large state-of-the-art conventional models (e.g., a server-based model with separate AM, PM, and LMs)) and attention-based sequence-to-sequence models (e.g., LAS model) in terms of quality (e.g., speech recognition accuracy as often measured by word error rate (WER)). To compensate for these lags in speech recognition accuracy, there has been a recent focus on developing a two-pass recognition system that includes a first-pass component of an RNN-T network followed by a second-pass component of a LAS network for rescoring recognition results generated during the first pass. With this design, the two-pass model benefits from the streaming nature of an RNN-T model with low latency while improving the accuracy of the RNN-T model through the second-pass incorporating the LAS network. Although the LAS network increases the latency when compared to only a RNN-T model, the increase in latency is considered reasonably slight and complies with latency constraints for on-device operation.

While suitable for providing streaming transcription capabilities, as well as latency-sensitive applications, that generally recognize conversational queries (e.g., set a timer", "remind me to buy the milk", etc.), RNN-T models leveraging Long Short-Term Memory (LSTM) to provide a sequence encoder have limited ability to look ahead audio context, and thereby become prone to deleting words when recognizing long-form speech. As used herein, long-form speech include non-conversational queries such as dictation-based queries where the user speaks to dictate an email, a message, document, social media post, or other piece of content.

Often, a user will employ a streaming speech recognition model, such as the RNN-T model, for recognizing conversational queries and a separate non-streaming speech recognition model for recognizing non-conversation queries. Typically, the application the user is directing his/her speech toward can be used to identify which one of the streaming or non-streaming speech recognition model to use for speech recognition. Requiring different and separate speech recognition models for performing speech recognition depending on the application and/or query type is computationally expensive and requires sufficient memory capacity for storing the respective models on the user device. Even if one of the models is executable on a remote server, additional costs for connecting to the remote server and bandwidth constraints can impact speech recognition performance, and ultimately, user experience.

Implementations herein are directed toward a single transformer-transducer (T-T) model for unifying streaming and non-streaming speech recognition tasks. As will become apparent, the T-T model may provide the positive attributes of RNN-T models such as streaming transcription capability, low latency speech recognition, small computational footprint, and low memory requirements, without suffering the aforementioned drawbacks of RNN-T models. That is, the T-T model may be trained on variable look ahead audio context so that a sufficient duration of look ahead audio context can be applied when performing speech recognition on an input utterance. Additionally, the T-T model may implement a y-architecture to provide a low latency branch for decoding streaming partial speech recognition results for an input utterance and a high latency branch for decoding a final speech recognition result for the same input utterance in parallel.

FIG. 1 is an example of a speech environment 100. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 implementing a transformer-transducer (T-T) model 200 resides on the user device 10 of the user 104 and/or on a remote computing device 60 (e.g., one or more remote servers of a distributed system executing in a cloud-computing environment) in communication with the user device 10 via a network 40. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the T-T model 200 receives, as input, the audio data 110 corresponding to the utterance 106, and generates/predicts, as output, a corresponding transcription 120 (e.g., recognition result/hypothesis) of the utterance 106. As described in greater detail below, the T-T model 200 may be trained with variable look ahead audio context to allow the T-T model 200 to set, during inference, different durations of look ahead audio context when performing speech recognition depending on how sensitive a query specified by the utterance 106 is to latency and/or how much tolerance the user 106 has for latency. For instance, a digital assistant application 50 executing on the user device 10 may require the speech recognition to be streaming such that words, word pieces, and/or individual characters appear on the screen as soon as they are spoken. Additionally, it is also likely that the user 104 of the user device 10 has a low tolerance for latency when issuing queries for the digital assistant application 50 to perform. In such scenarios when minimizing speech recognition latency is preferred, the T-T model 200 may apply zero or minimal look ahead audio context (also referred to as "right context") to provide streaming transcription capabilities in real-time as the user 104 is speaking the utterance 106. On the other hand, when the user has a higher tolerance for speech recognition latency and/or the utterance 106 to be recognized is associated with long-form speech, the same T-T model 200 may apply a duration of look ahead audio context sufficient to provide an accurate transcription 120, but incur increased latency based on the duration of look ahead audio context. Accordingly, the ASR system 118 may implement only a single T-T model 200 for a multitude of different speech recognition tasks to provide both streaming and non-streaming transcription capabilities without having to leverage separate ASR models on a task-by-task basis.

In some implementations, the T-T model 200 performs both streaming speech recognition and non-streaming speech recognition on the audio data 110 in parallel. For instance, in the example shown, the T-T model 200 performs, in parallel, streaming speech recognition on the audio data 110 using a first decoding branch (i.e., a low latency branch 321 (FIG. 3B)) to produce partial speech recognition results 120, 120a, and non-streaming speech recognition on the same audio data 110 using a second decoding branch (i.e., a high latency branch 322 (FIG. 3B)) to produce a final speech recognition result 120, 120b. Notably, the first decoding branch uses a first look ahead audio context that may be set to zero (or about 240 milliseconds) to produce the partial speech recognition results 120a while the second decoding branch may use a second look ahead audio context of a longer duration than the first look ahead audio context to produce the final speech recognition result 120b. Thus, the final speech recognition result 120b for the input utterance 106 may be delayed from the partial speech recognition results 120a for the input utterance by a duration based on a difference between the second look ahead audio context and the first look ahead audio context.

The user device 10 and/or the remote computing device 60 also executes a user interface generator 107 configured to present a representation of the transcription 120 of the utterance 106 to the user 104 of the user device 10. As described in greater detail below, the user interface generator 107 may display the partial speech recognition results 120a in a streaming fashion during time 1 and subsequently display the final speech recognition result 120b during time 2. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

Continuing with the example, the T-T model 200, while receiving the acoustic frames 110 corresponding to the utterance 106 as the user 104 speaks, encodes the acoustic frames 110 using a first look ahead audio context and then decodes the encoded acoustic frames 110 using the first look ahead audio context into the partial speech recognition results 120a. During time 1, the user interface generator 107 presents, via the digital assistant interface 18, a representation of the partial speech recognition results 120a of the utterance 106 to the user 104 of the user device 10 in a streaming fashion such that words, word pieces, and/or individual characters appear on the screen as soon as they are spoken. In some examples, the first look ahead audio context is equal to zero.

In parallel, and after all of the acoustic frames 110 corresponding to the utterance 106 are received, the T-T model 200 encodes all of the acoustic frames 110 corresponding to the utterance 106 using a second look ahead audio context and then decodes the acoustic frames 110 using the second look ahead audio context into a final speech recognition result 120b. The duration of the second look ahead audio context may be 1.2 seconds, 2.4 seconds, or any other duration. In some examples, an indication such as an endpoint indicating that the user 104 has finished speaking the utterance 106 triggers the T-T model 200 to encode all the acoustic frames 110 using the second look ahead audio context. During time 2, the user interface generator 107 presents, via the digital assistant interface 18, a representation of the final speech recognition result 120b of the utterance 106 to the user 104 of the user device 10. In some implementations, the user interface generator 107 replaces the representation of the partial speech recognition results 120a with the representation of the final speech recognition result 120b. For instance, as the final speech recognition result 120b is presumed to be more accurate than the partial speech recognition results 120a produced without leveraging look ahead audio context, the final speech recognition result 120b ultimately displayed as the transcription 120 may fix any terms that may have been misrecognized in the partial speech recognition results 120a. In this example, the streaming partial speech recognition results 120a output by the T-T model 200 and displayed on the screen of the user device at time 1 are associated with low latency and provide responsiveness to the user 104 that his/her query is being processed, while the final speech recognition result 120b output by the T-T model 200 and displayed on the screen at time 2 leverages look ahead audio context to improve the speech recognition quality in terms of accuracy, but at increased latency. However, since the partial speech recognition results 120a are displayed as the user speaks the utterance 106, the higher latency associated with producing, and ultimately displaying the final recognition result is not noticeable to the user 104.

In the example shown in FIG. 1, the digital assistant application 50 may respond to the question posed by the user 10 using natural language processing. Natural language processing generally refers to a process of interpreting written language (e.g., the partial speech recognition results 120a and/or the final speech recognition result 120b) and determining whether the written language prompts any action. In this example, the digital assistant application 50 uses natural language processing to recognize that the question from the user 10 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote server 60 in communication with the data processing hardware 12 of the user device 10.

Figure 2:
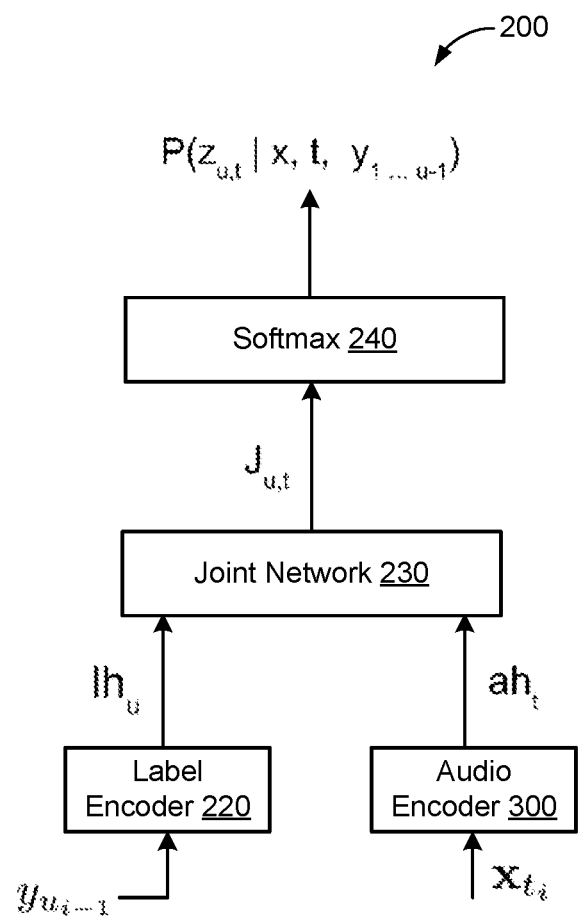
FIG. 2 is a schematic view of an example transducer-transformer model architecture.
Figure 3A:
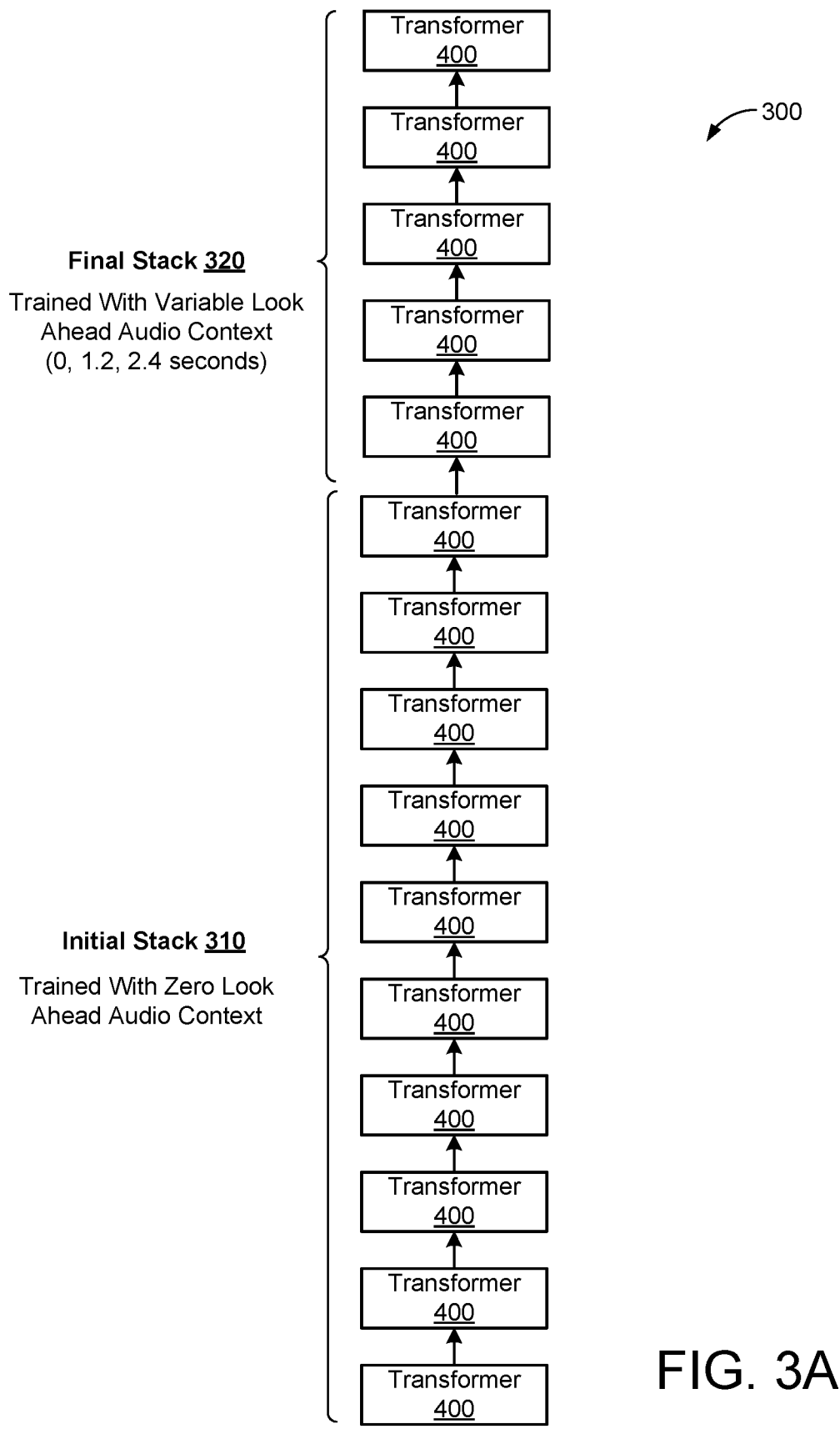
FIG. 3A is a schematic view of an audio encoder including a plurality of transformer layers.
Figure 3B:
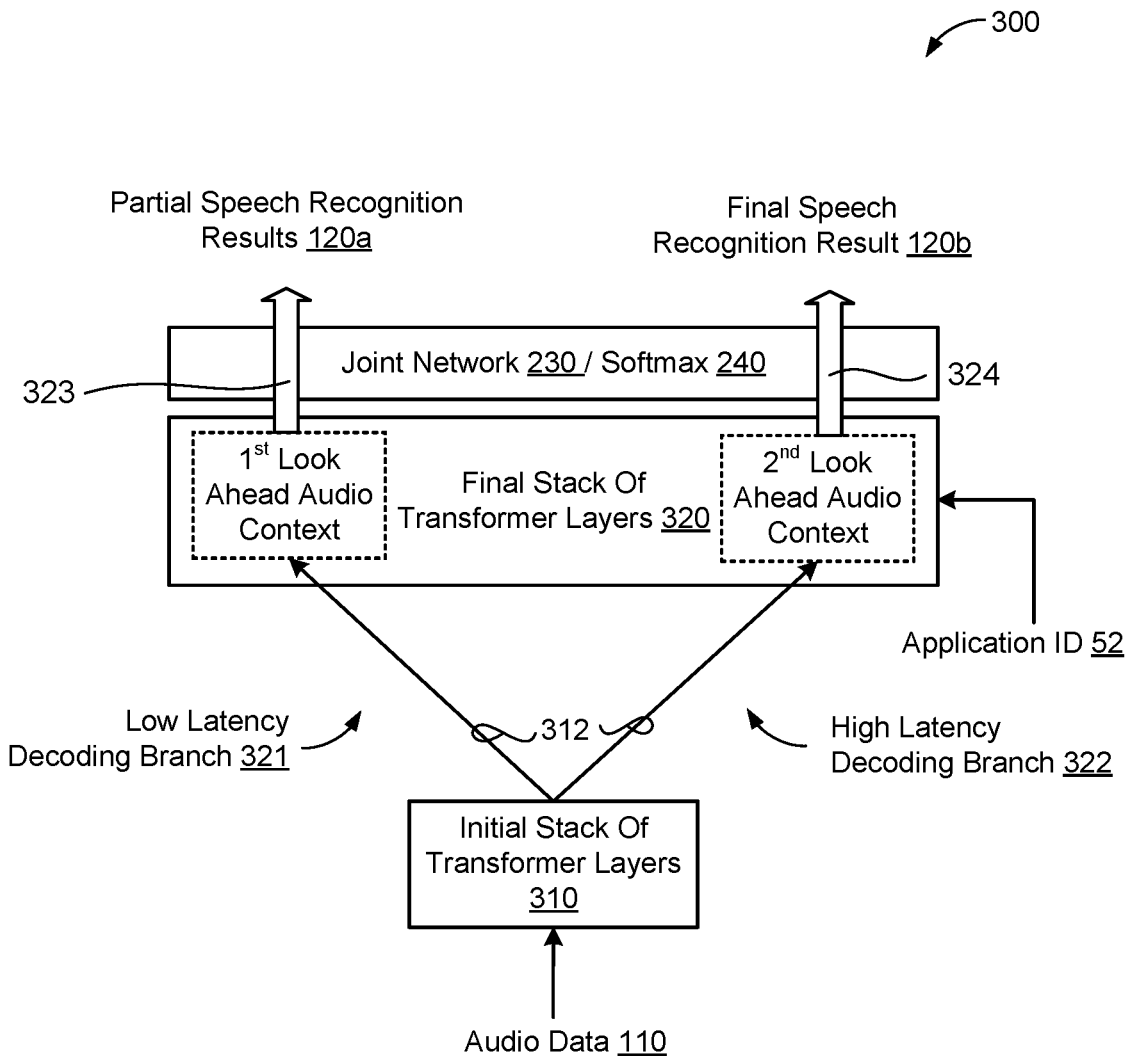
FIG. 3B is a schematic view of an audio encoder arranged in a y-architecture to provide parallel low and high latency decoding branches.
Figure 4:
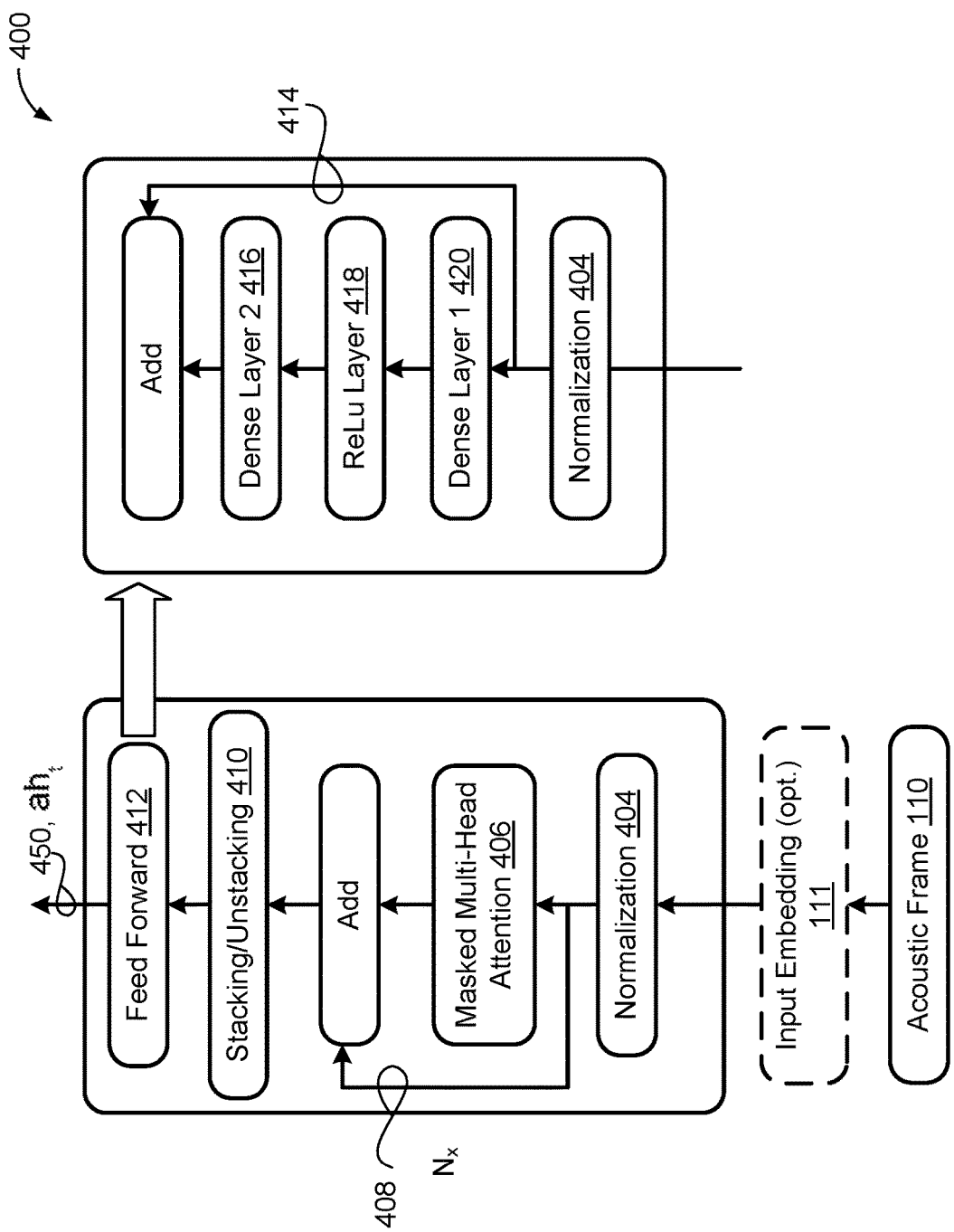
FIG. 4 is a schematic view of an example transformer architecture.

With reference to FIG. 2, the T-T model 200 may provide an end-to-end (E2E) speech recognition by integrating acoustic, pronunciation, and language models into a single neural network, and does not require a lexicon or a separate text normalization component. Various structures and optimization mechanisms can provide increased accuracy and reduced model training time. The T-T model 200 includes a Transformer-Transducer (T-T) model architecture, which adheres to latency constraints associated with interactive applications. The T-T model 200 provides a small computational footprint and utilizes less memory requirements than conventional ASR architectures, making the T-T model architecture suitable for performing speech recognition entirely on the user device 10 (e.g., no communication with a remote server 60 is required). The T-T model 200 includes an audio encoder 300, a label encoder 220, and a joint network 230. The audio encoder 300, which is roughly analogous to an acoustic model (AM) in a traditional ASR system, includes a neural network having a plurality of transformer layers 400 (FIGS. 3A, 3B, and 4). For instance, the audio encoder 300 reads a sequence of d-dimensional feature vectors (e.g., acoustic frames 110 (FIG. 1)) $x=(x_1, x_2, \ldots, x_T)$, where $x_t \in \mathbb{R}_d$, and produces at each time step a higher-order feature representation. This higher-order feature representation is denoted as $ah_1, \ldots, ah_T$.

Similarly, the label encoder 220 may also include a neural network of transformer layers or a look-up table embedding model, which, like a language model (LM), processes the sequence of non-blank symbols output by a final Softmax layer 240 so far, $y_0, \ldots, y_{ui-1}$, into a dense representation $lh_u$ that encodes predicted label history. In implementations when the label encoder 220 includes the neural network of transformer layers, each transformer layer may include a normalization layer, a masked multi-head attention layer with relative position encoding, a residual connection, a feed forward layer, and a dropout layer. In these implementations, the label encoder 220 may include two transformer layers. In implementations when the label encoder 220 includes the look-up table embedding model with a bi-gram label context, the embedding model is configured to learn a weight vector of the d-dimension for each possible bigram label context, where d is the dimension of the outputs of the audio and label encoders 300, 220. In some examples, the total number of parameters in the embedding model is $N^2 \times d$ where N is the vocabulary size for the labels. Here, the learned weight vector is then used as the embedding of the bigram label context in the T-T model 200 to produce fast label encoder 220 runtimes.

Finally, with the T-T model architecture, the representations produced by the audio and label encoders 300, 220 are combined by the joint network 230 using a dense layer $J_{u,t}$.

The joint network 230 then predicts $P(z_{u,t}|x, t, y_1, \ldots, y_{u-1})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels (also referred to as "speech units") each representing a grapheme (e.g., symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector (e.g., a one-hot vector) and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $z_{u,t}$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the T-T model 200 at the corresponding output step. In this manner, the T-T model 200 does not make a conditional independence assumption, rather the prediction of each symbol is conditioned not only on the acoustics but also on the sequence of labels output so far.

Referring to FIG. 3A, in some implementations, the plurality of transformer layers 400 of the audio encoder 300 of the T-T model 200 includes an initial stack 310 of transformer layers 400 and a final stack 320 of transformer layers 400. Each transformer layer 400 in the initial stack 310 may be trained with zero look ahead audio context, while each transformer layer 400 in the final stack 320 may be trained with variable look ahead audio context. The initial stack 310 of the T-T model 200 may have more transformer layers 400 than the final stack 320 of transformer layers 400. For instance, the initial stack 310 of transformer layers 400 may include 15 transformer layers 400 while the final stack 320 of transformer layers 400 may include five (5) transformer layers 400. However, the respective number of transformer layers 400 in each one of the initial stack 310 and final stack 320 is non-limiting. Accordingly, while examples herein may describe the initial stack 310 including 15 transformer layers 400 and the final stack 320 of transformer layers including five transformer layers 400, the initial stack 310 of transformer layers 400 may include less than or more than 15 transformer layers 400, and the final stack 320 of transformer layers 400 may include less than or more than five transformer layers 400. Moreover, the total number of transformer layers 400 utilized by the audio encoder 300 may be less than or greater than 20 transformer layers 400.

The T-T model 200 is trained on a training data set of audio data corresponding to spoken utterances paired with corresponding transcriptions. Training the T-T model 200 may include on the remote server 60 and the trained T-T model 200 may be pushed to the user device 10. Training the final stack 320 of transformer layers 400 with variable look ahead audio context includes setting the left context of each transformer layer 400 in the final stack 320 constant and sampling a right context length of each layer in the final stack 320 from a given distribution in the training data set. Here, the sample right context length corresponds to a duration of the look ahead audio context sampled from the given distribution. As will become apparent, the sampled right context length designates a mask for self attention applied by a corresponding masked multi-head attention layer 406 (FIG. 4) of each transformer layer 400 in the final stack 320.

In some implementations, during training of the audio encoder 300, the variable look ahead audio context is uniformly sampled for each transformer layer 400 in the final stack 320 of transformer layers 400. For example, the variable look ahead audio context uniformly sampled for each transformer layer 400 in the final stack 320 of transformer layers 400 may include durations of zero, 1.2 seconds, and 2.4 seconds. These durations of look ahead audio context are non-limiting and may include different durations and/or sampling more or less than three different durations of look ahead audio context for the final stack 320 of transformer layers 400. In these implementations during training, a respective look ahead context configuration for the transformer layers 400 may be specified for each different duration of look ahead audio context. Moreover, the audio encoder 300 of the T-T model 200 may be trained with an output delay of four acoustic frames 110. For instance, continuing with the example above where the initial stack 310 of 15 transformer layers 400 is trained with no (zero) look ahead audio context and the final stack 320 of five transformer layers 400 is trained with variable look audio context, a first look ahead context configuration specified for zero look ahead audio context may include [0]×19+[4], a second look ahead context configuration specified for 1.2 seconds of look ahead audio context may include [0]×15+ [8]×5, and a third look ahead audio context configuration specified for 2.4 seconds of look ahead audio context may include [0]×15+[16]×5. The number in brackets in each of the look ahead audio context configurations indicates a number of look ahead audio frames corresponding to the specified duration of look ahead audio context. In the example above, the first look ahead context configuration of [0]×19+[4] used for evaluating zero look ahead audio context indicates that the final transformer layer 400 applies an output delay of four audio frames 110. Here, the output delay of four audio frames corresponds to 240 milliseconds of look ahead audio context.

In some additional implementations, rather than training the initial stack 310 of transformer layers 400 with zero look ahead audio context and only training the final stack 320 of transformer layers 400 with variable look ahead audio context, all of the transformer layers 400 of the audio encoder 300 of the T-T model 200 are trained with variable look ahead audio context. Continuing with the example above where the durations of zero, 1.2 seconds, and 2.4 seconds of look ahead context are uniformly sampled during training, a first look ahead context configuration specified for zero look ahead audio context may include [0]×19+[4] (e.g., where [4] specifies that the final transformer layer 400 applies the output delay of four audio frames corresponding to 240 milliseconds of look ahead audio context), a second look ahead context configuration specified for 1.2 seconds of look ahead audio context may include [2]×20, and a third look ahead audio context configuration specified for 2.4 seconds of look ahead audio context may include [4]×20. That is, the output delay of two [2] audio frames applied by each of the 20 transformer layers 400 evaluates a given distribution of the training data set for 1.2 seconds of look ahead audio context and the output delay of four [4] audio frames applied by each of the 20 transformer layers 400 evaluates another distribution of the training data set for 2.4 seconds of look ahead audio context.

FIG. 3B illustrates an example of the T-T model 200 having the audio encoder 300 arranged in a y-architecture to enable the single T-T model 200 to perform, in parallel, streaming speech recognition and non-streaming speech recognition on an input utterance 106. The y-architecture of the audio encoder 300 is formed by parallel low and high latency branches 321, 322 that each extend from the initial stack 310 of transformer layers 400. As described above with reference to FIG. 3A, the initial stack 310 of transformer layers 400 may be trained with zero look ahead audio context and the final stack 320 of transformer layers 400 may be trained with variable look ahead audio context. Accordingly, during inference, the final stack 320 of transformer layers 400 may provide both: the low latency branch 321 (also referred to as 'low latency decoding branch 321'), by applying a first look ahead audio context; and the high latency branch 322 (also referred to as 'high latency decoding branch 322'), by applying a second look ahead audio context associated with a longer duration of look ahead audio context than the first look ahead audio context.

In some examples, the first look ahead audio context is zero or a minimal output delay (e.g., 240 milliseconds) to reduce word error rate loss due to constrained alignments applied during training. The second look ahead audio context may include any duration of look ahead audio context. For instance the second look ahead audio context may include a duration of 1.2 seconds or 2.4 seconds.

In the example shown, the initial stack 310 of transformer layers 400 of the audio encoder 300 receives the audio data 110 (e.g., acoustic frames) corresponding to the input utterance 106 spoken by the user 104 and captured by the user device 10. While receiving the audio data 110, the initial stack 310 of transformer layers 400 (e.g., 15 transformer layers 400) may apply zero look ahead audio context to compute shared activations 312 for use by both the low latency branch 321 and the high latency branch 322. Thereafter, and while receiving the audio data 110 as the user 104 is speaking the input utterance 106, the final stack 320 of transformer layers 400 (e.g., five transformer layers 400) uses the shared activations 312 computed by the initial stack 310 of transformer layers 400 and applies the first look ahead audio context to compute low latency activations 323 for use by the low latency branch 321 and not the high latency branch 322 that may be decoded via the joint network 230 and softmax 240 to provide partial speech recognition results 120a for the input utterance 106. Accordingly, while receiving the audio data 110 corresponding to the input utterance 106, the low latency branch 321 encodes the audio data 110 using the first look ahead audio context and decodes the encoded audio data 110 (i.e., represented by the low latency activations 323) into the partial speech recognition results 120a. The partial speech recognition results 120a may be streamed in real-time for display on the user device 10 (FIG. 1) as the input utterance 106 is spoken by the user 104.

After the user 104 has completed speaking the input utterance 106 and all the audio data 110 is received, the final stack 320 of transformer layers 400 uses the shared activations 312 computed by the initial stack 310 of transformer layers 400 and applies the second look ahead audio context to compute high latency activations 324 for use by the high latency branch 322 and not the low latency branch 321 that may be decoded via the joint network 230 and softmax layer 240 to provide the final speech recognition result 120b for the input utterance 106. Here, the final speech recognition result 120b decoded by the high latency branch 322 for the input utterance 106 is delayed from the partial speech recognition results 120a decoded by the low latency branch 321 by a duration based on a difference between the second look ahead audio context and the first look ahead audio context. Accordingly, after the audio data 110 corresponding to the input utterance 106 is received (e.g., the user 104 has completed speaking the utterance 106), the high latency branch 322 encodes the audio data 110 using the second look ahead audio context and decodes the encoded audio data 110 (i.e., represented by the high latency activations 324) into the final speech recognition result 120b. The final speech recognition result 120b may replace the streamed partial speech recognition results 120a. Notably, since the partial speech recognition results 120a may be streamed in real time, the user 104 may not perceive the latency incurred by the final speech recognition result 120b. Yet, the final speech recognition result 120b benefiting from look ahead audio context may correct any recognition errors present in the partial speech recognition result 120a, thereby rendering the final speech recognition result 120b more suitable for query interpretation by downstream NLU modules and/or applications. While not shown, a separate rescoring model (e.g., LAS model) may rescore candidate hypothesis decoded by the high latency decoding branch 322.

In some examples, the duration of the second look ahead audio context is based on a type of application (e.g., digital assistant application 50) the input utterance 106 is directed toward. For instance, the audio encoder 300 may receive an application identifier 52 indicating a type of application the input utterance is directed toward and the audio encoder may set the duration of the second look ahead audio context based on the application identifier 52. The type of application the input utterance 106 is directed toward may serve as context information indicating the user's tolerance for speech recognition latency, speech recognition accuracy, whether the input utterance corresponds to a conversational query (e.g., short-form speech) or a non-conversational query (e.g., long-form speech such as dictation), or any other information that may be derived for use in optimizing/tuning the duration of second look ahead audio context applied.

FIG. 4 shows an example transformer layer 400 among the plurality of transformer layers of the audio encoder 300. Here, during each time step, the initial transformer layer 400 receives a corresponding acoustic frame 110 as input and generates a corresponding output representation/embedding 450 received as input by the next transformer layer 400. That is, each transformer layer 400 subsequent the initial transformer layer 400 may receive an input embedding 450 that corresponds to the output representation/embedding generated as output by the immediately preceding transformer layer 400. The final transformer layer 400 (e.g., the last transformer layer in the final stack 320) generates, at each of the plurality of time steps, the higher order feature representation $ah_t$ (FIG. 2) for the corresponding acoustic frame 110.

The input to the label encoder 220 (FIG. 2) may include a vector (e.g., a one-hot vector) indicating the sequence of non-blank symbols output by a final Softmax layer 240 so far, $y_0, \ldots, y_{ui-1}$. Accordingly, when the label encoder 220 includes transformer layers, the initial transformer layer may receive an input embedding 111 by passing the the one-hot vector through a look-up table.

Each transformer layer 400 of the audio encoder 300 includes a normalization layer 404, a masked multi-head attention layer 406 with relative position encoding, residual connections 408, a stacking/unstacking layer 410, and a feedforward layer 412. The masked multi-head attention layer 406 with relative position encoding provides a flexible way to control the amount (i.e., duration) of look ahead audio context that the T-T model 200 uses. Specifically, after the normalization layer 404 normalizes the acoustic frame 110 and/or input embedding 111, the masked multi-head attention layer 406 projects the input to a value for all the heads. Thereafter, the masked multi-head layer 406 may mask an attention score to the left of the current acoustic frame 110 to produce an output conditioned only on the previous acoustic frames 110. Then, weight-averaged values for all the heads are concatenated and passed to a dense layer 2 416, where a residual connection 414 is added to the normalized input and the output of the dense layer 416 to form the final output of the multi-head attention layer 406 with relative position encoding. The residual connections 408 are added to the output of the normalization layer 404 and are provided as inputs to a respective one of the masked multi-head attention layer 406 or the feedforward layer 412. The stacking/unstacking layer 410 can be used to change a frame rate for each transformer layer 400 to speed up training and inference.

The feedforward layer 412 applies normalization layer 404, followed by dense layer 1 420, rectified linear layer (ReLu) 418, and dense layer 2 416. The ReLu 418 is used as the activation on the output of dense layer 1 420. Like in the multi-head attention layer 406 with relative position encoding, a residual connection 414 of the output from the normalized layer 404 is added to the output of the dense layer 2 416.

Figure 5:
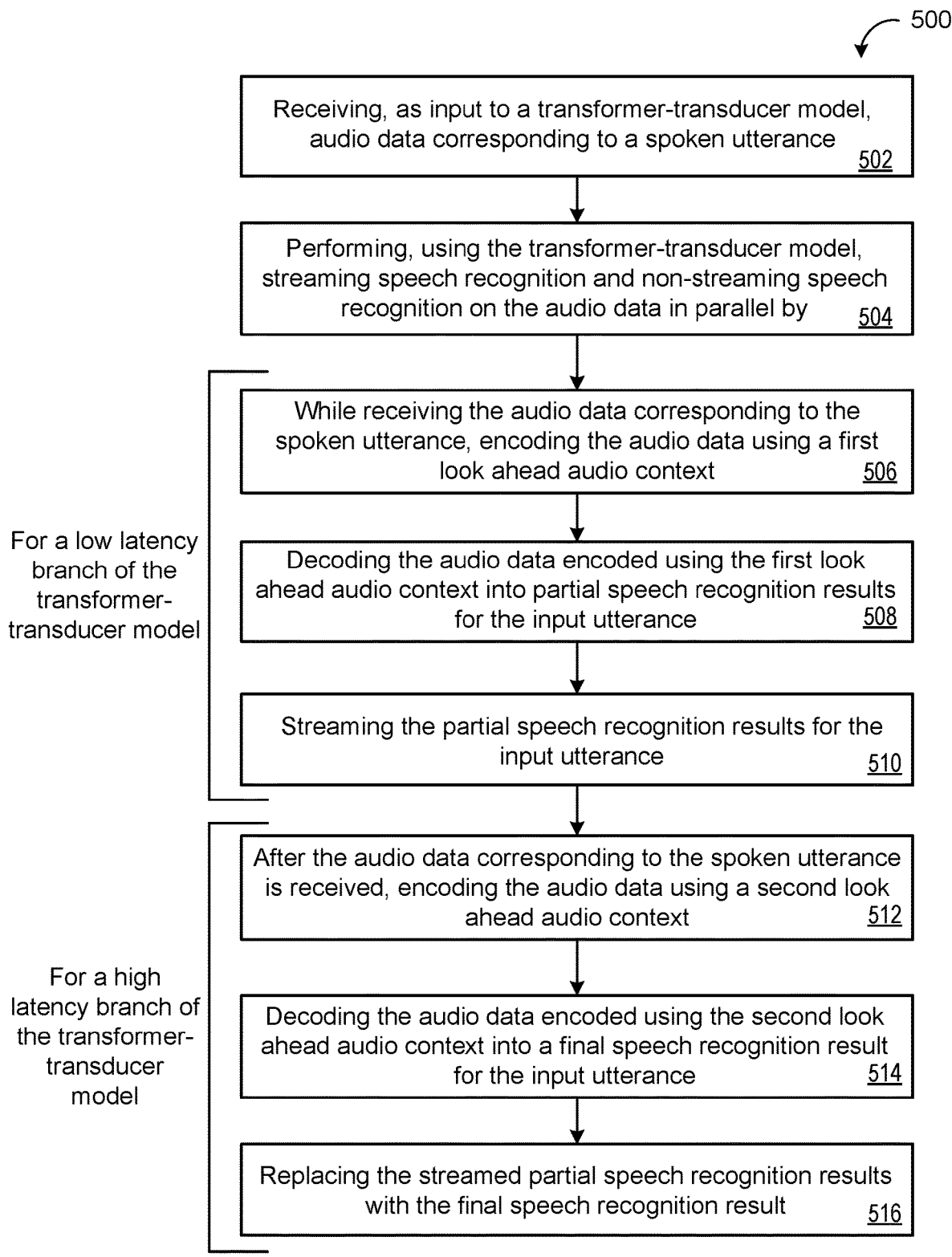
FIG. 5 is flowchart of an example arrangement of operations for a method of unifying streaming and non-streaming speech recognition using the transformer-transducer model of FIG. 1.

FIG. 5 includes a flowchart of an example arrangement of operations for a method 500 of unifying streaming and non-streaming speech recognition using a single transformer-transducer (T-T) model 200. At operation 502, the method 500 includes receiving, as input to a T-T model 200, audio data 110 corresponding to a spoken utterance 106. At operation 504, the method further includes performing, using the T-T model 200, streaming speech recognition and non-streaming speech recognition on the audio data 110 in parallel.

For a low latency branch 321 of the T-T model 200, the method 500 includes, at operation 506, while receiving the audio data 110 corresponding to the spoken utterance 106, encoding the audio data 110 using a first look ahead audio context. The method 500 also includes, at operation 508, decoding the audio data 110 encoded using the first look ahead audio context into partial speech recognition results 120a for the input utterance 106. At operation 510, the method 500 further includes streaming the partial speech recognition results 120a for the input utterance 106.

For a high latency branch 322 of the T-T model 200, the method 500 includes, at operation 512, after the audio data 110 corresponding to the spoken utterance 106 is received, encoding the audio data 110 using a second look ahead audio context. The method 500 also includes, at operation 514, decoding the audio data 110 encoded using the second look ahead audio context into a final speech recognition result 120b for the input utterance 106. At operation 516, the method 500 further includes replacing the streamed partial speech recognition results 120a with the final speech recognition result 120b.

Figure 6:
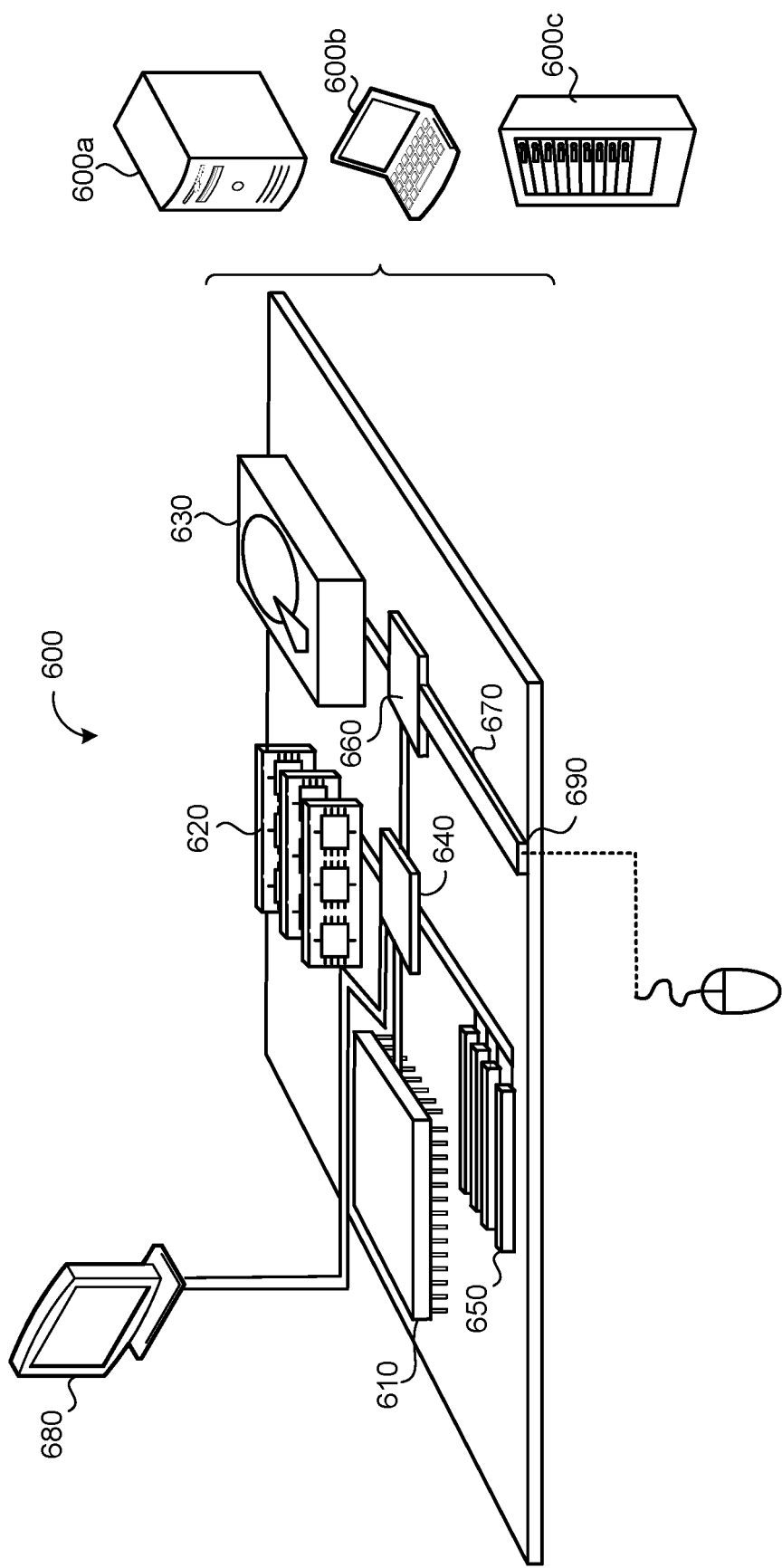
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
receiving audio data corresponding to a spoken utterance;
encoding, by an initial stack of multi-head attention layers, the audio data to compute shared activations:
while receiving the audio data corresponding to the spoken utterance:
encoding, by a final stack of multi-head attention layers while applying a first look ahead audio context, the shared activations to compute low latency activations; and
decoding the low latency activations into partial speech recognition results for the spoken utterance; and
after the audio data corresponding to the spoken utterance is received:
encoding, by the final stack of multi-head attention layers while applying a second look ahead audio context, the shared activations to compute high latency activations; and
decoding the high latency activations into a final speech recognition result for the spoken utterance,
wherein:
the initial stack of multi-head attention layers are trained with zero look ahead audio context; and
the final stack of multi-head attention layers are trained with variable look ahead audio context.

2. The computer-implemented method of claim 1, wherein the operations further comprise, while receiving the audio data corresponding to the spoken utterance, streaming the partial speech recognition results for the spoken utterance.

3. The computer-implemented method of claim 2, wherein the operations further comprise, after the audio data corresponding to the spoken utterance is received, replacing the streamed partial speech recognition results with the final speech recognition result.

4. The computer-implemented method of claim 1, wherein during training, the variable look ahead audio context is uniformly sampled for each multi-head attention layer in the final stack of multi-head attention layers.

5. The computer-implemented method of claim 1, wherein the initial stack of multi-head attention layers comprises more multi-head attention layers than the final stack of multi-head attention layers.

6. The computer-implemented method of claim 1, wherein the first look ahead audio context comprises zero look ahead audio context.

7. The computer-implemented method of claim 1, wherein a low latency decoding branch decodes the low latency activations into the partial speech recognition results for the spoken utterance in parallel with a high latency decoding branch decoding the high latency activations into the final speech recognition result for the spoken utterance.

8. The computer-implemented method of claim 1, wherein the final speech recognition result decoded from the shared activations is delayed from the partial speech recognition results decoded from the shared activations by a duration based on a difference between the second look ahead audio context and the first look ahead audio context.

9. The computer-implemented method of claim 1, wherein the operations further comprise:
receiving an application identifier indicating a type of application the spoken utterance is directed toward; and
setting a duration of the second look ahead audio context based on the application identifier.

10. A system comprising:
data processing hardware; and
memory hardware in communication with the data processing hardware and storing instructions that when executed by the data processing hardware cause the data processing hardware to perform operations comprising:
receiving audio data corresponding to a spoken utterance;
encoding, by an initial stack of multi-head attention layers, the audio data to compute shared activations:
while receiving the audio data corresponding to the spoken utterance:
encoding, by a final stack of multi-head attention layers while applying a first look ahead audio context, the shared activations to compute low latency activations; and
decoding the low latency activations into partial speech recognition results for the spoken utterance; and
after the audio data corresponding to the spoken utterance is received:
encoding, by the final stack of multi-head attention layers while applying a second look ahead audio context, the shared activations to compute high latency activations; and
decoding the high latency activations into a final speech recognition result for the spoken utterance,
wherein:
the initial stack of multi-head attention layers are trained with zero look ahead audio context; and
the final stack of multi-head attention layers are trained with variable look ahead audio context.

11. The system of claim 10, wherein the operations further comprise, while receiving the audio data corresponding to the spoken utterance, streaming the partial speech recognition results for the spoken utterance.

12. The system of claim 11, wherein the operations further comprise, after the audio data corresponding to the spoken utterance is received, replacing the streamed partial speech recognition results with the final speech recognition result.

13. The system of claim 10, wherein during training, the variable look ahead audio context is uniformly sampled for each multi-head attention layer in the final stack of multi-head attention layers.

14. The system of claim 10, wherein the initial stack of multi-head attention layers comprises more multi-head attention layers than the final stack of multi-head attention layers.

15. The system of claim 10, wherein the first look ahead audio context comprises zero look ahead audio context.

16. The system of claim 10, wherein a low latency decoding branch decodes the low latency activations into the partial speech recognition results for the spoken utterance in parallel with a high latency decoding branch decoding the high latency activations into the final speech recognition result for the spoken utterance.

17. The system of claim 10, wherein the final speech recognition result decoded from the shared activations is delayed from the partial speech recognition results decoded from the shared activations by a duration based on a difference between the second look ahead audio context and the first look ahead audio context.

18. The system of claim 10, wherein the operations further comprise:
receiving an application identifier indicating a type of application the spoken utterance is directed toward; and setting a duration of the second look ahead audio context based on the application identifier.

* * * * *